(12) United States Patent
He et al.

(10) Patent No.: US 10,218,291 B2
(45) Date of Patent: Feb. 26, 2019

(54) DEVICE FOR GENERATING ELECTRICITY BY FRICTION AND MANUFACTURING METHOD THEREOF

(71) Applicant: Boe Technology Group Co., Ltd., Beijing (CN)

(72) Inventors: Fang He, Beijing (CN); Tian Yang, Beijing (CN); Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 456 days.

(21) Appl. No.: 14/906,037

(22) PCT Filed: Jul. 20, 2015

(86) PCT No.: PCT/CN2015/084417
§ 371 (c)(1),
(2) Date: Jan. 19, 2016

(87) PCT Pub. No.: WO2016/127575
PCT Pub. Date: Aug. 18, 2016

(65) Prior Publication Data
US 2016/0373028 A1     Dec. 22, 2016

(30) Foreign Application Priority Data
Feb. 13, 2015 (CN) .......................... 2015 1 0080906

(51) Int. Cl.
*H02N 1/04* (2006.01)
(52) U.S. Cl.
CPC .................................... *H02N 1/04* (2013.01)
(58) Field of Classification Search
CPC ....................................................... H02N 1/04
(Continued)

(56) References Cited

U.S. PATENT DOCUMENTS 9,812,993 B2 * 11/2017 Wang .................. H02N 1/04
9,825,557 B2 * 11/2017 Wang .................. H02N 1/04
(Continued)

FOREIGN PATENT DOCUMENTS

CN       203086374      7/2013
CN       103368447      10/2013
(Continued)

OTHER PUBLICATIONS

Office Action from China Application No. 201510080906.3 dated Jan. 12, 2017.
(Continued)

*Primary Examiner* — Alexander Talpalatski
(74) *Attorney, Agent, or Firm* — Calfee, Halter & Griswold LLP

(57) ABSTRACT

A device for generating electricity by friction and a manufacturing method thereof. The device comprises a first substrate and a second substrate arranged oppositely, and a plurality of elastic columns arranged between the first substrate and the second substrate to support them. A surface of the first substrate facing the second substrate is provided with a first conductive electrode and an insulating polymeric membrane layer which are stacked. A surface of the second substrate facing the first substrate is provided with a second conductive electrode. At least one surface of the two opposite surfaces of the second conductive electrode and the insulating polymeric membrane layer is formed into a surface with a concave-convex structure. The friction area between the second conductive electrode and the insulating polymeric membrane layer can be increased upon relative movement between the first substrate and the second substrate.

16 Claims, 6 Drawing Sheets

(58) Field of Classification Search
USPC .......................................................... 310/310
See application file for complete search history.

(56) References Cited

U.S. PATENT DOCUMENTS

| | | | | |
|---|---|---|---|---|
| 9,837,933 | B2* | 12/2017 | Park | ...................... H01L 41/113 |
| 2014/0300248 | A1* | 10/2014 | Wang | ..................... G01L 9/0072 |
| | | | | 310/300 |
| 2014/0338458 | A1 | 11/2014 | Wang et al. | |
| 2015/0061464 | A1* | 3/2015 | Park | ...................... H01L 41/113 |
| | | | | 310/329 |
| 2015/0311823 | A1* | 10/2015 | Wang | ....................... H02N 1/04 |
| | | | | 310/300 |

FOREIGN PATENT DOCUMENTS

| | | |
|---|---|---|
| CN | 103368458 | 10/2013 |
| CN | 103780134 | 5/2014 |
| CN | 104076084 | 10/2014 |
| CN | 104242723 | 12/2014 |
| CN | 104660095 | 5/2015 |

OTHER PUBLICATIONS

Notice of Reexamination from Chinese Application No. 201510080906.3 dated Jan. 19, 2018.
Office Action from Chinese Application No. 201510080906.3 dated Mar. 15, 2017.
International Search Report and Written Opinion from PCT/CN15/84417 dated Nov. 6, 2015.
Office action from Chinese Application No. 201510080906.3 dated May 19, 2016.
Notice of Reexamination from Chinese Application No. 201510080906.3 dated Nov. 14, 2017.

* cited by examiner

DEVICE FOR GENERATING ELECTRICITY BY FRICTION AND MANUFACTURING METHOD THEREOF

RELATED APPLICATIONS

The present application is the U.S. national phase entry of PCT/CN2015/084417, with an international filing date of Jul. 20, 2015, which claims the benefit of Chinese Patent Application No. 201510080906.3, filed on Feb. 13, 2015, the entire disclosures of which are incorporated herein by reference.

FIELD OF THE INVENTION

The present invention relates to the technical field of energy equipment, in particular to a device for generating electricity by friction and a manufacturing method thereof.

BACKGROUND OF THE INVENTION

An existing device for generating electricity by friction, as shown in FIG. 1, comprises a balance weight 10, an upper electrode arranged onto the balance weight 10, and a polymeric insulating layer 20 arranged onto the upper electrode. It further comprises a lower electrode 30 opposite to the polymeric insulating layer 20, and the lower electrode 30 is connected with the balance weight 10 via an elastic support means 40. In use, due to the friction and electrostatic induction effect between the lower electrode 30 and the polymeric insulating layer 20, the device for generating electricity by friction is equivalent to a cell structure. Such device can convert mechanical energy into electric energy, which has a wide application prospect. Such device utilizes the friction between surfaces of two materials to enable one material to obtain electrons and the other one to lose electrons, thereby generating electric energy upon friction. However, the efficiency of the device for generating electricity by friction in the prior art is relatively low.

SUMMARY OF THE INVENTION

Embodiments of the present invention provide a device for generating electricity by friction and a manufacturing method thereof for improving the electricity-generating efficiency of the device for generating electricity by friction.

An embodiment of the invention provides a device for generating electricity by friction. The device comprises a first substrate and a second substrate arranged oppositely, and a plurality of elastic columns arranged between the first substrate and the second substrate to support them, wherein a surface of the first substrate facing the second substrate is provided with a first conductive electrode and an insulating polymeric membrane layer which are stacked along a direction where the first substrate points to the second substrate; a surface of the second substrate facing the first substrate is provided with a photosensitive resin layer having a concave-convex structure formed by exposure. The device for generating electricity by friction further comprises a second conductive electrode covering the concave-convex structure of the photosensitive resin layer to form a surface with a concave-convex structure.

The above technical solution enables the force of friction between the second conductive electrode and the insulating polymeric membrane layer to be increased upon relative movement between the first substrate and the second substrate by forming at least one of two opposite surfaces of the second conductive electrode and the insulating polymeric membrane layer into a surface with a concave-convex structure, thereby improving efficiency of the whole device in generating electricity by friction.

Moreover, in the embodiment, since the photosensitive resin layer has certain tenacity, the second conductive electrode covering the photosensitive resin layer also has certain extension such that it can better contact the insulating polymeric membrane layer to increase the friction area and improve the friction efficiency.

In one embodiment, a surface of the insulating polymeric membrane layer facing the second conductive electrode has a concave-convex structure. The concave-convex structure is formed on the insulating polymeric membrane layer to increase the force of friction.

In an embodiment, at least one of the first substrate and the second substrate can be a polyimide flexible substrate.

In an embodiment, each elastic column may comprise a first elastic column and a second elastic column connected to the first elastic column, wherein a contact area between the first elastic column and the second elastic column is smaller than the cross-sectional area of the second elastic column. The elasticity restoring force can be improved by means of two elastic columns.

In an embodiment, the elastic column may be a column made of elastic resin material. Such a column can have better elastic recovery performance.

In an embodiment, the device for generating electricity by friction may further comprise a sealing agent for sealing the oppositely arranged first substrate and the second substrate. The sealing agent employs a colloid with elastic deformation. In this way, it can improve the sealing effect and further improve the stability of the whole device.

An embodiment of the present invention provides a manufacturing method of a device for generating electricity by friction. The method comprises steps of: forming a first substrate; forming a first conductive electrode on the first substrate; forming an insulating polymeric membrane layer on the first conductive electrode; forming a second substrate; forming a photosensitive resin layer on the second substrate; forming by exposure a surface with a concave-convex structure on the photosensitive resin layer; sputtering metal on the concave-convex structure to form a second conductive electrode; and arranging the first substrate and the second substrate oppositely and arranging elastic columns to support them, with the insulating polymeric membrane layer and the second conductive electrode being oppositely arranged.

In the above technical solution, the concave-convex structure is arranged to increase the force of friction of the device for generating electricity by friction upon friction, further improving the electricity-generating efficiency of the device for generating electricity by friction.

In another embodiment, the manufacturing method further comprises forming by plasma treatment a surface with a concave-convex structure on the insulating polymeric membrane layer. Formation of the concave-convex structure on the insulating polymeric membrane layer may further increase the friction area.

In an embodiment, the steps of forming the first substrate and forming the second substrate comprise forming a first polyimide flexible substrate on a first glass substrate, and forming a second polyimide flexible substrate on a second glass substrate.

In another embodiment, the manufacturing method further comprises sealing the oppositely arranged first substrate and second substrate by a sealing agent. This can improve the sealing effect and further improve the stability of the whole device.

In an another embodiment, the manufacturing method may further comprise stripping the first glass substrate and the second glass substrate off the first substrate and the second substrate, respectively.

The device for generating electricity by friction as provided in the embodiments of the present invention enables the force of friction between the second conductive electrode and the insulating polymeric membrane layer to be increased upon relative movement between the first substrate and the second substrate by forming at least one of two opposite surfaces of the second conductive electrode and the insulating polymeric membrane layer into a surface with a concave-convex structure, thereby improving efficiency of the whole device in generating electricity by friction.

REFERENCE SIGNS

10—a balance weight, 20—a polymeric insulating layer, 30—a lower electrode, 40—an elastic support means, 1—a first substrate, 2—a first conductive electrode, 3—an insulating polymeric membrane layer, 31—a concave-convex structure, 4—an elastic column, 41—a first elastic column, 42—a second elastic column, 5—a sealing agent, 6—a second substrate, 7—a photosensitive resin layer, 71—a concave-convex structure, 8—a second conductive electrode

DETAILED DESCRIPTION OF THE INVENTION

In order to improve the electricity-generating efficiency of a device for generating electricity by friction, an embodiment of the present invention provide a device for generating electricity by friction. The technical solutions of the embodiments of the present invention enable the force of friction to be increased upon relative movement between the two substrates by forming a concave-convex structure on at least one of two opposite surfaces of the second conductive electrode and the insulating polymeric membrane layer, thereby improving efficiency in generating electricity by friction. To achieve the objective, and make the technical solutions and advantages of the present invention clearer, the present invention will be further set forth in detail taking non-limiting embodiments as examples.

Figure 1:
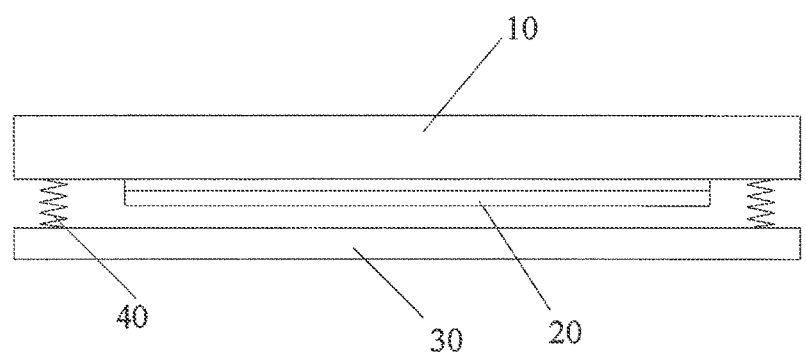
FIG. 1 is a schematic diagram of the structure of a device for generating electricity by friction in the prior art.
Figure 2:
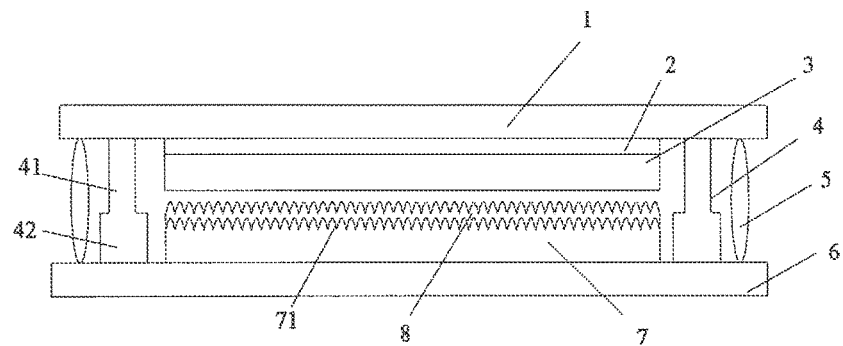
FIG. 2 is a schematic diagram of the structure of a device for generating electricity by friction as provided in an embodiment of the present invention.
Figure 3:
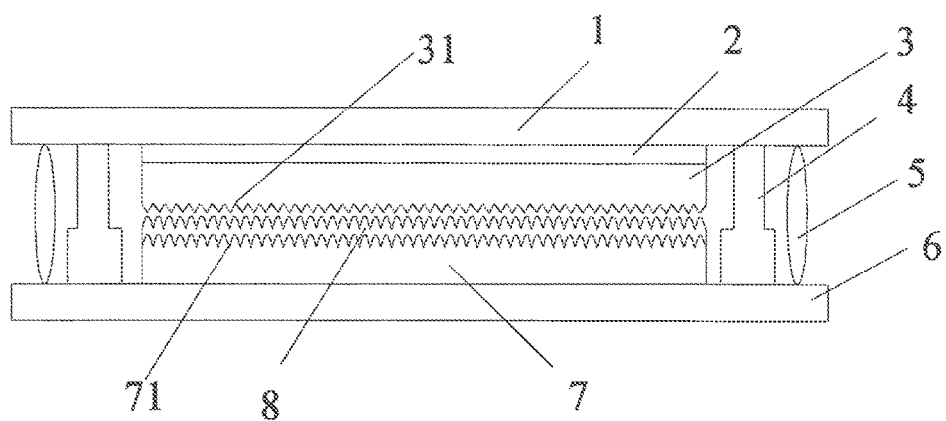
FIG. 3 is a schematic diagram of the structure of a device for generating electricity by friction as provided in another embodiment of the present invention.

As shown in FIGS. 2 and 3, schematic diagrams of devices for generating electricity by friction according to different embodiments are illustrated.

An embodiment of the present invention provides a device for generating electricity by friction. The device may comprise a first substrate 1 and a second substrate 6, arranged oppositely, and a plurality of elastic columns 4 arranged between the first substrate 1 and the second substrate 6 to support them. A surface of the first substrate 1 facing the second substrate 6 is provided with a first conductive electrode 2 and an insulating polymeric membrane layer 3, which are stacked along a direction where the first substrate 1 points to the second substrate 6. A surface of the second substrate 6 facing the first substrate 1 is provided with a photosensitive resin layer 7, and the photosensitive resin layer 7 and has a concave-convex structure 71 formed by exposure. The device further comprises a second conductive electrode 8 covering the concave-convex structure 71 of the photosensitive resin 7 and having a surface with a concave-convex structure.

Alternatively, in another embodiment, the surface of the second conductive electrode 8 may have no concave-convex structure, while the insulating polymeric membrane layer 3 may have a surface with a concave-convex structure. For example, it is possible to form a concave-convex structure on the insulating polymeric membrane layer 3 by a dry etching method.

The above embodiments enable the force of friction between the second conductive electrode 8 and the insulating polymeric membrane layer 3 to be increased upon relative movement between the first substrate 1 and the second substrate 6 by forming at least one of two opposite surfaces of the second conductive electrode and the insulating polymeric membrane layer 3 into a surface with a concave-convex structure, thereby improving efficiency of the whole device in generating electricity by friction. Moreover, with regards to the situation of forming the surface of the second conductive electrode facing the insulating polymeric membrane layer into a surface with a concave-convex structure, it is possible to form a concave-convex structure 71 on the photosensitive resin layer 7 and form the second conductive electrode 8 on the concave-convex structure 71 by sputtering, thereby facilitating the formation of the second conductive electrode 8 and simplifying the difficulty in forming the second conductive electrode 8 into a concave-convex structure. Furthermore, in this situation, since the photosensitive resin layer 7 has a certain tenacity, the second conductive electrode 8 covering the photosensitive resin layer 7 also has a certain extension such that it can better contact the insulating polymeric membrane layer 3 to increase the friction area and improve the friction efficiency.

To facilitate the understanding of the device for generating electricity by friction as provided in the embodiments of the present invention, the structure thereof will be described in detail as follows in combination with detailed embodiments and figures.

Among the two opposite surfaces of the insulating polymeric membrane layer 3 and the second conductive electrode 8 as mentioned above, at least one surface has a concave-convex structure. This can be implemented using different structures. It is not only possible to set a concave-convex structure on one surface, but also possible to set it on the two surfaces simultaneously.

As shown in FIG. 2, one structure of the device for generating electricity by friction as provided by an embodiment of the present invention is illustrated. In this embodiment, a concave-convex structure is formed on one surface to increase the force of friction between the two substrates of the device for generating electricity by friction upon movement.

In an embodiment, the structure thereof may comprise a first substrate 1 and a second substrate 6 arranged oppositely, and a plurality of elastic columns 4 are arranged between the first substrate 1 and the second substrate 6 to support them, wherein a surface of the first substrate 1 facing the second substrate 6 is provided with a first conductive electrode 2 and an insulating polymeric membrane layer 3, which are stacked along a direction where the first substrate 1 points to the second substrate 6. A surface of the second substrate 6 facing the first substrate 1 is provided with a second conductive electrode 8, and a surface of the second conductive electrode 8 facing the insulating polymeric membrane layer 3 is provided with a concave-convex structure, thereby increasing the force of friction between the insulating polymeric membrane layer 3 and the second conductive electrode 8, and further improving the electricity-generating efficiency of the device for generating electricity by friction.

In addition, since the second conductive electrode 8 is a metal layer, at the time of forming a concave-convex structure on the surface of the second conductive electrode 8, it may be quite complicated or difficult to directly form a concave-convex structure on the surface thereof. This embodiment can form a concave-convex structure by using the following structure. In one embodiment, a photosensitive resin layer 7 can be provided between the second substrate 6 and the second conductive electrode 8. The photosensitive resin layer 7 has a concave-convex structure formed by exposure. The second conductive electrode 8 covers the concave-convex structure of the photosensitive resin layer 7 to form a surface with a concave-convex structure. During manufacture, a photosensitive resin layer 7 is firs formed on the second substrate 6, and a concave-convex structure is then formed on the photosensitive resin layer 7 by exposure process, and subsequently metal is sputtered on the concave-convex structure of the photosensitive resin layer 7 by a sputtering process to form a second conductive electrode 8 such that the second conductive electrode 8 can have a concave-convex structure to increase the friction area between the insulating polymeric membrane layer 3 and the second conductive electrode 8.

At least one of the first substrate 1 and the second substrate 6 may be a polyimide flexible substrate, i.e., using the polyimide flexible substrate as a substrate for supporting the whole device for generating electricity by friction.

The elastic column 4 may act as a component for providing restoring force. When at least one substrate of the first substrate 1 and the second substrate 6 moves relatively under the effect of external force, the elastic column 4 is compressed, there is friction between the insulating polymeric membrane layer 3 and the second conductive electrode 8, which generates electricity. After completion of this process, when the external force is withdrawn, the elastic column 4 returns to its initial state under the effect of its own elasticity, thereby driving the first substrate 1 and the second substrate 6 to return to their initial positions. Different elastic means can be selected to provide the elastic column 4. It is not only possible to use a spring, but also possible to use a column made of a material with elastic property, such as elastic metal, rubber, and so on. In an embodiment, the elastic column 4 may be a column made of an elastic resin. With respect to the arrangement of elastic columns 4, as shown in FIG. 2, elastic columns may be arranged at two sides of the first conductive electrode 2, respectively, such that two ends of the substrates can bear the same resistance provided by the elastic columns 4 when the first substrate 1 and the second substrate 6 are applied with external force so as to ensure that the first substrate 1 and the second substrate 6 would not be tilted upon movement, enabling the two opposite surfaces of the insulating polymeric membrane layer 3 and the second conductive electrode 8 to contact each other entirely to increase the contact area upon friction and further increase the force of friction. In an embodiment, each elastic column 4 comprises a first elastic column 41 and a second elastic column 42 connected to the first elastic column 41. A contact area between the first elastic column 41 and the second elastic column 42 may be smaller than the cross-sectional area of the second elastic column 42. The first elastic column 41 and the second elastic column 42 can both be a cylinder. In this case, the diameter of the first elastic column 41 may be smaller than that of the second elastic column 42. Dividing the elastic column 4 into two parts can decrease the difficulty in fabricating the elastic column 4 because it may be difficult for an existing process to fabricate a fairly thick elastic column. Dividing the elastic column into two parts guarantees the feasibility of process. Moreover, one part being larger than the other part ensures that no deviation occurs when the two parts are connected, and also ensures that the elastic column can have better support strength. In use, when the first substrate 1 or the second substrate 6 is applied with external force, the first elastic column may have a large amount of deformation while the second elastic column may have a small amount of deformation.

Furthermore, the device for generating electricity by friction as provided in the present embodiment may further comprise a sealing agent 5 for sealing the first substrate 1 and the second substrate 6. The first substrate 1 and the second substrate 6 are sealed with the sealing agent 5 to form a sealed device. This can protect the components arranged between the two substrates from corrosion by the outside, so as to improve the stability of the whole device for generating electricity by friction. The sealing agent 5 may employ a colloid with elastic deformation such as rubber. Use of a polyimide flexible substrate and use of an elastic colloid (such as rubber) as the sealing agent can both increase the contact area between the frictional layers upon friction of the device.

In another embodiment, the two opposite surfaces of the insulating polymeric membrane layer 3 and the second conductive electrode 8 can both be set as a concave-convex structure, thereby increasing the friction area of the device for generating electricity by friction upon friction and further improving the efficiency of the device for generating electricity by friction in generating electricity.

A concave-convex structure on the second conductive electrode 8 may be formed in the same way as that in the structure as described in the aforesaid embodiment. The difference between this embodiment and the aforesaid embodiment lies in forming a concave-convex structure 31 on a surface of the insulating polymeric membrane layer 3 facing the second conductive electrode 8.

In this embodiment, the device for generating electricity by friction may comprise the same first substrate 1, second substrate 6, first conductive electrode 2, elastic columns 4 and sealing agent 5 as the aforesaid embodiment, which are not repeated here.

The difference between the device for generating electricity by friction as provided in the present embodiment and that as provided in the aforesaid embodiment lies in forming a concave-convex structure on the insulating polymeric membrane layer 3. As shown in FIG. 3, in this embodiment, a surface of the insulating polymeric membrane layer 3 facing the second conductive electrode 8 may have a concave-convex structure formed by dry-etching.

In the present embodiment, a concave-convex structure is directly formed on the insulating polymeric membrane layer 3 and the friction area of the device for generating electricity by friction is increased by means of the formed concave-convex structure at the time of generating electricity by friction, so as to improve the efficiency thereof in generating electricity.

When forming the concave-convex structure of the insulating polymeric membrane layer 3, the concave-convex structure can be fabricated by a dry etching method on the insulating polymeric membrane layer 3. In an embodiment, the insulating polymeric membrane layer 3 can be treated with plasma such that it forms a surface with a concave-convex structure, wherein the plasma may be, e.g. oxygen plasma, etc.

It can be seen from the device for generating electricity by friction as provided in the present embodiment that, the two opposite surfaces of the insulating polymeric membrane layer 3 and the second conductive electrode 8 are provided with a concave-convex structure, respectively, thus it further increases the friction area of the device for generating electricity by friction and further improves the efficiency thereof in generating electricity, as compared with the aforesaid embodiment.

Alternatively, in other embodiments, the surface of the second conductive electrode 8 may have no concave-convex structure, while only the insulating polymeric membrane layer 3 has a surface with a concave-convex structure. For example, it is possible to form a concave-convex structure on the insulating polymeric membrane layer 3 by a dry etching method.

It should be understood that the above embodiments are just part of possible embodiments of the present invention. The device for generating electricity by friction as provided by embodiments of the invention shall not be only limited to the specific structures as described in the above embodiments.

Furthermore, an embodiment of the present invention further provides a manufacturing method of a device for generating electricity by friction, and the method comprises the steps of:

forming a first substrate 1;

forming a first conductive electrode 2 on the first substrate 1;

forming an insulating polymeric membrane layer 3 on the first conductive electrode 2;

forming a second substrate 6;

forming a photosensitive resin layer 7 on the second substrate 6;

forming by exposure a surface with a concave-convex structure 71 on the photosensitive resin layer 7, sputtering metal on the concave-convex structure 71 to form a second conductive electrode 8;

arranging the first substrate 1 and the second substrate 6 oppositely and arranging elastic columns 4 between them, the insulating polymeric membrane layer 3 and the second conductive electrode 8 being arranged oppositely.

It can be seen from the above embodiment that, the force of friction between the second conductive electrode and the insulating polymeric membrane layer 3 can be increased when the first substrate 1 and the second substrate 6 move relative to each other by forming at least one surface of the two opposite surfaces of the second conductive electrode and the insulating polymeric membrane layer 3 into a surface with a concave-convex structure, thereby improving the electricity-generating efficiency of the whole device in generating electricity by friction.

During the process of forming at least one surface of the surface of the insulating polymeric membrane layer 3 and the surface of the second conductive electrode 8 into a surface with a concave-convex structure, different concave-convex structures can be formed, for example:

A. forming a photosensitive resin layer 7 on the second substrate 6, forming a surface with a concave-convex structure 71 by exposure on the photosensitive resin layer 7, sputtering metal on the concave-convex structure 71 to form a second conductive electrode 8;

B. meanwhile, forming a surface with a concave-convex structure on the insulating polymeric membrane layer 3 by means of a dry etching method;

or, forming a photosensitive resin layer 7 on the second substrate 6, forming a surface with a concave-convex structure by exposure on the photosensitive resin layer 7, sputtering metal on the concave-convex structure to form a second conductive electrode 8.

Alternatively, it is also possible to only form a surface with a concave-convex structure on the insulating polymeric membrane layer 3 by means of a dry etching method.

The above three formed structures can all increase the friction area of the device for generating electricity by friction upon friction thereof, and further improve the efficiency thereof in generating electricity. It can be seen from the above embodiments of the device for generating electricity by friction that, for the embodiment of forming the device for generating electricity by friction in which either surface of the two opposite surfaces of the second conductive electrode and the insulating polymeric membrane layer thereof is formed into a concave-convex structure, the manufacturing process thereof includes the steps required in the embodiment of only forming one surface of the two opposite surfaces of the second conductive electrode and the insulating polymeric membrane layer into a concave-convex structure. Therefore, a manufacturing method of a device for generating electricity by friction as provided in an embodiment of the invention will be set forth in detail as follows in combination with FIGS. 4a-4l by taking the case of forming the device for generating electricity by friction in which said two surfaces are both formed into a concave-convex structure as an example.

Step 1: forming a first substrate 1.

Figure 4A:
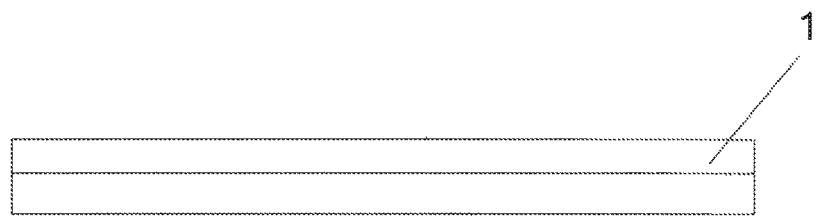
FIGS. 4a-4l are flow charts for manufacturing the device for generating electricity by friction as provided in FIG. 3.

As shown in FIG. 4a, a first polyimide flexible substrate is formed on a first glass substrate.

Step 2: forming a first conductive electrode 2 on the first substrate 1.

Figure 4B:
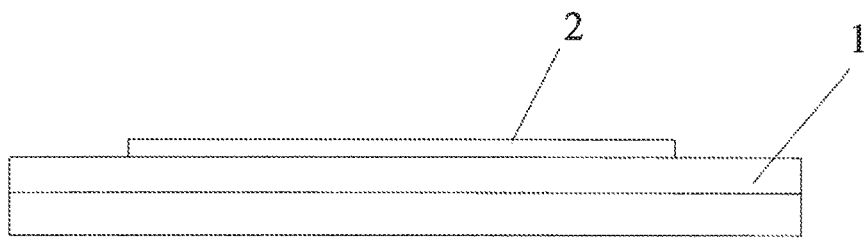

As shown in FIG. 4b, a first conductive electrode 2 can be directly formed on the formed first polyimide flexible substrate 1.

Figure 4C:
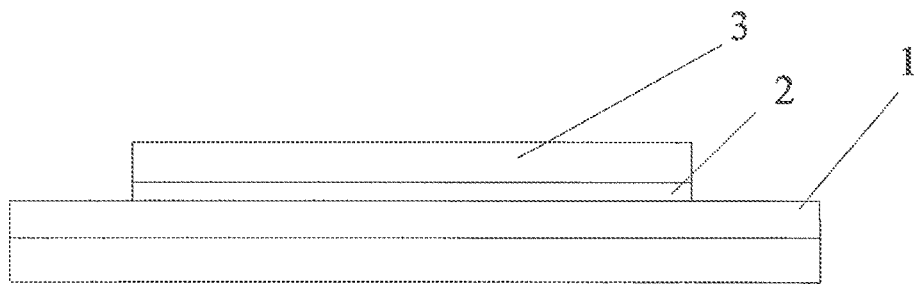

Step 3: forming an insulating polymeric membrane layer 3 on the first conductive electrode 2. As shown in FIG. 4c, an insulating polymeric membrane layer 3 can be directly formed on the first conductive electrode 2.

Figure 4D:
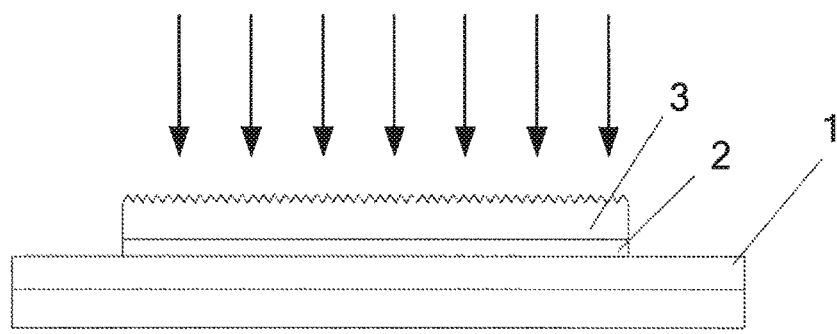

Step 4: forming a surface with a concave-convex structure on the insulating polymeric membrane layer 3 by means of a dry etching method. As shown in FIG. 4d, the insulating polymeric membrane layer 3 can be treated with plasma to form a concave-convex structure 31, the plasma may employ oxygen plasma. The plasma is suitable for treating organics, thus complex mask process is not required, the process is simple and the cost is low.

Figure 4E:
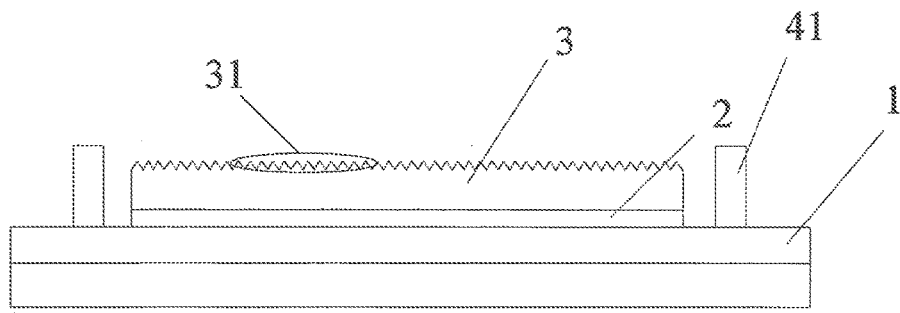

Step 5: forming a first elastic column 41 on the first substrate 1. As shown in FIG. 4e, first elastic columns 41 can be formed symmetrically at two sides of the first conductive electrode 2.

Figure 4F:
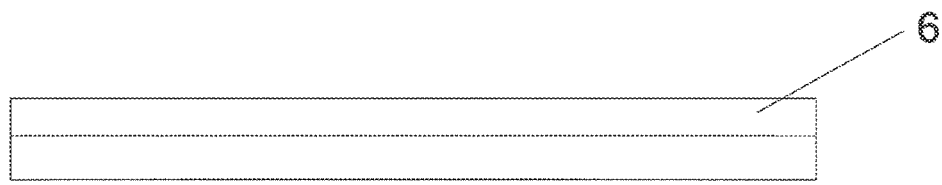

Step 6: forming a second substrate 6. As shown in FIG. 4f, a second substrate 6 is formed on a second glass substrate, and the second substrate 6 can be a polyimide flexible substrate.

Figure 4G:
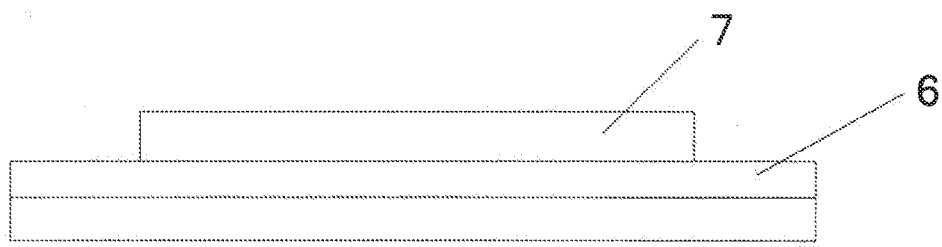

Step 7: forming a photosensitive resin layer 7 on the formed second substrate 6. As shown in FIG. 4g, a photosensitive resin layer 7 can be directly formed on the second substrate 6.

Figure 4H:
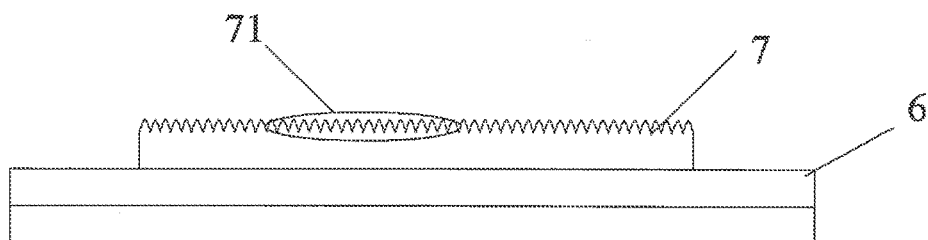

Step 8: forming a concave-convex structure 71 on the photosensitive resin layer 7. As shown in FIG. 4h, a mask plate can be made firstly, which may be a structure having meshed holes; an exposure plate can cover the photosensitive resin layer 7, then exposes and develops it; and the photosensitive resin in the exposure area is stripped off to form a concave-convex structure 71 on the photosensitive resin layer 7.

Figure 4I:
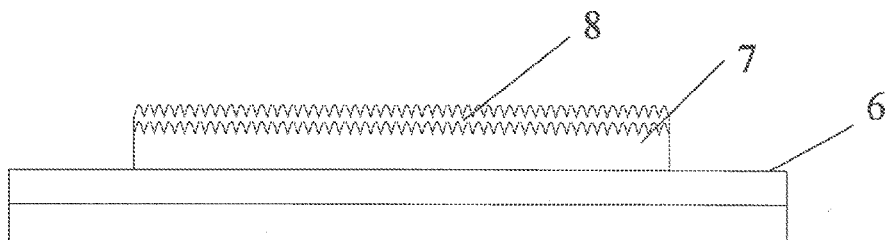

Step 9: forming a second conductive electrode 8 on the photosensitive resin layer 7. As shown in FIG. 4i, a metal layer may be sputtered on the concave-convex structure 71 of the photosensitive resin layer 7; the sputtered metal layer forms a second conductive electrode 8; the metal layer covers the concave-convex structure 71 to form a surface with a concave-convex structure. The second conductive electrode 8 is formed by sputtering metal on the photosensitive resin layer 7, and the concave-convex structure can be formed after the formation of the second conductive electrode 8 by sputtering. This facilitates the manufacturing.

Step 10: forming second elastic columns 42 on the second substrate 6.

Figure 4J:
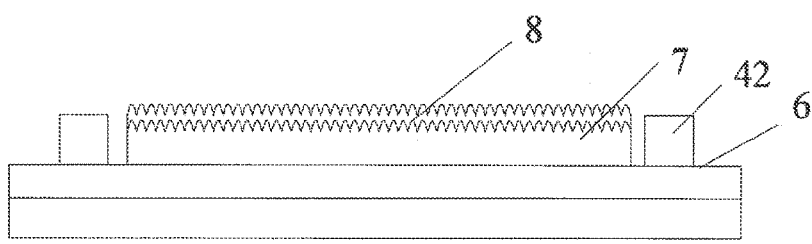

As shown in FIG. 4j, second elastic columns 42 can be arranged symmetrically at two sides of the second conductive electrode 8. And the diameter of the second elastic column 42 can be larger than that of the first elastic column 41.

Figure 4K:
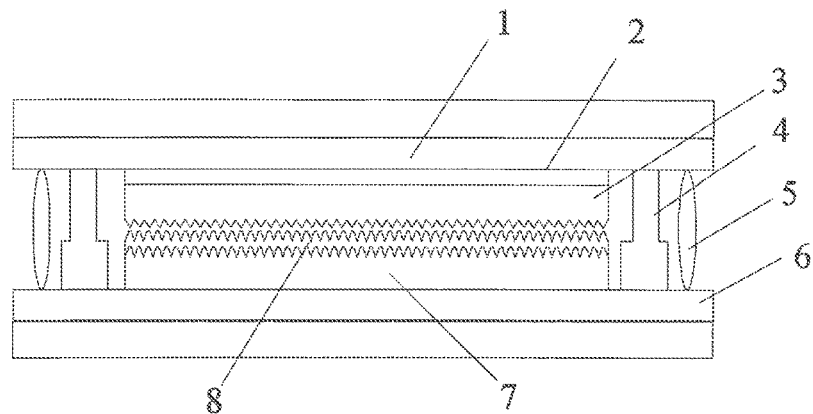

Step 11: performing box aligning and encapsulation of the first substrate 1 and the second substrate 6. As shown in FIG. 4k, box aligning of the first substrate 1 and the second substrate 6 is performed. At that time, the concave-convex structure on the insulating polymeric membrane layer 3 faces is opposite to that on the second conductive electrode 8, and the first elastic column 41 correspondingly resists and contacts the second elastic column 42. Then the two substrates are sealed with a sealing agent 5.

Figure 4L:
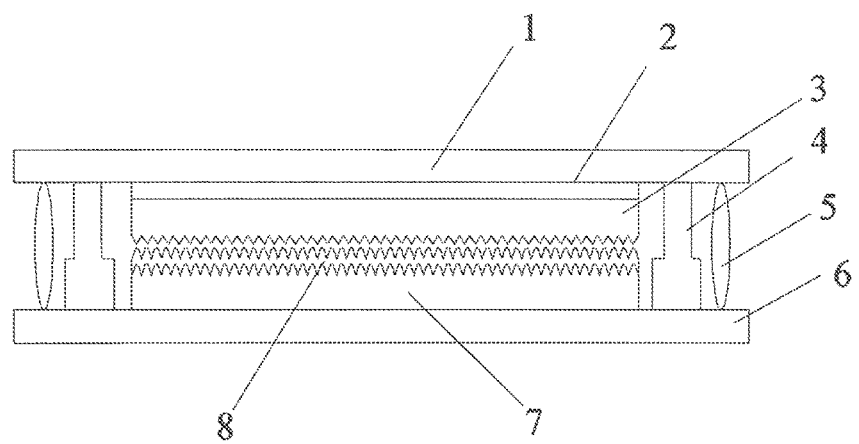

Step 12: stripping the glass substrates off. As shown in FIG. 4l, a device for generating electricity by friction is formed after stripping the first and second glass substrates off.

From the manufacturing method of the device for generating electricity by friction as provided in the above embodiment, it can be seen that, the device for generating electricity by friction as manufactured by the method provided in the present embodiment increases the friction area thereof by virtue of the arranged concave-convex structure and further improves the efficiency thereof in generating electricity.

Obviously, those skilled in the art can make modifications and variations to the embodiments of the invention without departing from the spirit and scope thereof. In this way, if these modifications and variations to these embodiments pertain to the scopes of the claims of the present invention and equivalent techniques thereof, the present invention also intends to include these modifications and variations

The invention claimed is:

1. A device for generating electricity by friction, comprising:
    a first substrate and a second substrate arranged oppositely;
    a plurality of elastic columns arranged between the first substrate and the second substrate to support them,
    wherein a surface of the first substrate facing the second substrate is provided with a first conductive electrode and an insulating polymeric membrane layer which are stacked along a direction where the first substrate points to the second substrate,
    wherein a surface of the second substrate facing the first substrate is provided with a photosensitive resin layer having a concave-convex structure formed by exposure, and
    wherein the device for generating electricity by friction further comprises a second conductive electrode covering the concave-convex structure of the photosensitive resin layer to form a surface with a concave-convex structure.

2. The device for generating electricity by friction according to claim 1, wherein a surface of the insulating polymeric membrane layer facing the second conductive electrode has a concave-convex structure.

3. The device for generating electricity by friction according to claim 2, wherein at least one of the first substrate and the second substrate is a polyimide flexible substrate.

4. The device for generating electricity by friction according to claim 3, wherein each elastic column comprises a first elastic column and a second elastic column connected to the first elastic column, wherein a contact area between the first elastic column and the second elastic column is smaller than the cross-sectional area of the second elastic column.

5. The device for generating electricity by friction according to claim 1, wherein the elastic column is a column made of an elastic resin.

6. The device for generating electricity by friction according to claim 1, further comprising a sealing agent for sealing the first substrate and the second substrate arranged oppositely, the sealing agent employing a colloid having elastic deformation.

7. The device for generating electricity by friction according to claim 2, further comprising a sealing agent for sealing the first substrate and the second substrate arranged oppositely, the sealing agent employing a colloid having elastic deformation.

8. The device for generating electricity by friction according to claim 3, further comprising a sealing agent for sealing the first substrate and the second substrate arranged oppositely, the sealing agent employing a colloid having elastic deformation.

9. The device for generating electricity by friction according to claim 4, further comprising a sealing agent for sealing the first substrate and the second substrate arranged oppositely, the sealing agent employing a colloid having elastic deformation.

10. The device for generating electricity by friction according to claim 5, further comprising a sealing agent for sealing the first substrate and the second substrate arranged oppositely, the sealing agent employing a colloid having elastic deformation.

11. A manufacturing method of a device for generating electricity by friction according to claim 1, the manufacturing method comprising steps of:
    forming the first substrate;
    forming the first conductive electrode on the first substrate;
    forming the insulating polymeric membrane layer on the first conductive electrode;
    forming the second substrate;
    forming the photosensitive resin layer on the second substrate;
    forming by exposure a surface with a concave-convex structure on the photosensitive resin layer;
    sputtering metal on the concave-convex structure to form the second conductive electrode;

arranging the first substrate and the second substrate oppositely and arranging elastic columns to support them, wherein the insulating polymeric membrane layer and the second conductive electrode being arranged oppositely.

12. The manufacturing method of a device for generating electricity by friction according to claim 11, wherein the manufacturing method further comprises forming by plasma treatment a surface with a concave-convex structure on the insulating polymeric membrane layer.

13. The manufacturing method of a device for generating electricity by friction according to claim 11, wherein the steps of forming the first substrate and forming the second substrate respectively comprise:
forming a first polyimide flexible substrate on a first glass substrate;
forming a second polyimide flexible substrate on a second glass substrate.

14. The manufacturing method of a device for generating electricity by friction according to claim 12, wherein the steps of forming the first substrate and forming the second substrate respectively comprise:
forming a first polyimide flexible substrate on a first glass substrate;
forming a second polyimide flexible substrate on a second glass substrate.

15. The manufacturing method of a device for generating electricity by friction according to claim 13, wherein the manufacturing method further comprises sealing the oppositely arranged first substrate and second substrate by a sealing agent.

16. The manufacturing method of a device for generating electricity by friction according to claim 14, wherein the manufacturing method further comprises stripping the first glass substrate and the second glass substrate off the first substrate and the second substrate, respectively.

* * * * *